June 30, 1970 H. A. SMITH 3,518,367
METHODS AND APPARATUS FOR PRODUCING ARTIFICIAL HOLOGRAMS
Filed June 7, 1966 3 Sheets-Sheet 1

INVENTOR:
HAROLD A. SMITH
BY
ATTORNEYS

June 30, 1970            H. A. SMITH            3,518,367

METHODS AND APPARATUS FOR PRODUCING ARTIFICIAL HOLOGRAMS

Filed June 7, 1966            3 Sheets-Sheet 3

INVENTOR:
HAROLD A. SMITH

BY
Breitenfeld & Levine
ATTORNEYS

United States Patent Office 3,518,367
Patented June 30, 1970

3,518,367
METHODS AND APPARATUS FOR PRODUCING
ARTIFICIAL HOLOGRAMS
Harold A. Smith, Plainfield, N.J., assignor to Devenco Incorporated, a corporation of New York
Filed June 7, 1966, Ser. No. 555,802
Int. Cl. H04n 5/84; G02b 3/00
U.S. Cl. 178—6.7
21 Claims

ABSTRACT OF THE DISCLOSURE

Data relating to the position and amplitude of a plurality of points on a three-dimensional object are obtained, and from this data a plurality of signals are produced. Amplitude and phase of each signal are related to the point on object to which the signal corresponds. Each signal is attenuated and phase shifted, and all signals are vectorially added to produce signals representing points on an imaginary hologram plane. Hologram signals are recorded on a medium which can modulate visible light. Object signals may be electrical signals, or they may be signals emanating from a two or three-dimensional array of signal propagators.

---

This invention relates to a method and apparatus for producing holograms. More particularly this invention relates to a method and apparatus for producing "artificial" holograms, i.e., holograms which can be produced from data representative of certain characteristics of the object, rather than from energy received directly from the object.

In the present specification, and the claims which follow, the term "object" is intended to mean any real object or objects which it is desired to record on a hologram, or any non-existent subjects, about which data is assumed, which are to appear on a hologram.

It is believed that the invention will be more readily understood if reference is made first to the known system of producing optical holograms. An optical hologram is a photographic record, such as a photographic transparency, of a "wave-front" of visible light reflected from a subject bathed in the light. Thus, in contrast to a transparency produced by conventional photography, which is a record of an image formed by bringing reflected light to a focus by means such as a lens, a hologram is a record of all the reflected light waves present in a single plane, i.e., a wave-front. Since no focusing mechanism is used when a hologram is made, no recognizable image appears on the hologram. Instead, to the naked eye, a hologram appears as a hodgepodge of specks, blobs, and whorls bearing no resemblance to the subject from which the light was reflected.

According to one known method of producing optical holograms, the subject to be "photographed" is illuminated by means of a coherent visible light source such as a laser. A wave pattern of light reflected from the subject exhibits both amplitude and phase variations. However, since photographic film is capable of recording only intensity, variations, some technique must be employed to convert the phase variations to amplitude variations which can be recorded. This is accomplished by using a reference beam of coherent visible light, derived from the same source as the illuminating light beam in such a way as to insure that the two beams will constructively and destructively interfere with each other. The reference beam is directed at the photographic film located in the "hologram plane." The reflected light and the reference beam interfere with each other to produce an interference pattern on the film. This pattern constitutes intensity variations which correspond to the phase and amplitude variations in the reflected light wave. For a reason which will be pointed out below, the reference beam is directed against the film at an angle to the path along which the reflected waves move toward the film.

When a hologram transparency, which has been developed from the exposed film, is illuminated with coherent visible light, a number of diffraction patterns or wave-fronts are propagated, one of which converges to form a real image of the subject and another of which appears to emanate from a virtual image of the subject. The virtual image can be viewed directly by the eye. This "reconstructed" image is not comparable to the two-dimensional image found on a conventional photographic transparency. Rather, it cannot be distinguished from the original three-dimensional subject. When viewing the reconstructed image, parallax (the apparent displacement of an object when seen from different directions) between near and far portions of the subject can be seen. Consequently, upon relative movement between the hologram and the observer, portions of the subject which may have been blocked by others can be seen. In addition, the observer must refocus his eyes to view near portions of the subject after viewing far portions. As a result of the angle between the reference beam and the path of reflected waves impinging upon the film, the real and virtual images are completely separate and hence do not in any way distort each other.

Production of optical holograms by illuminating subjects with coherent visible light, in the manner described above is known. It will be appreciated that such a procedure for producing optical holograms requires that an object to be recorded be available and directly within the range of the illuminating beam.

It is an object of this invention to provide a method and apparatus capable of producing holograms from data defining certain characteristics of the object, rather than directly from the object itself.

It is another object of this invention to provide a method and apparatus for producing holograms solely from information defining the amplitude and relative position of a plurality of points on the object to be recorded.

It is another object of this invention to provide such a method and apparatus wherein the hologram is produced by individually determining the intensity of each of a plurality of "points" on an imaginary hologram plane spaced from the object, and combining visual representations of the "points" on a single record to produce the complete hologram.

To accomplish these objectives, data relating to the position and amplitude of a plurality of points on a three-dimensional object are obtained. This data may be derived from, for example, X-ray tomograms, sonograms, radar data, radioactive tracer data, contour map data, or any similar data, which is capable of representing the amplitude and position of discrete points on an object. This data may also be numerical or binary data which may be derived from the known features of an object, or which may be assumed data concerning a non-existent object.

On the basis of this data a plurality of signals are produced, each signal being allocated to one of the points on the object. The amplitude of each object signal is made to correspond to the amplitude of its respective point on the object and the phase of each signal is made to correspond to some phase characteristic of its respective point on the object. Each object signal is attenuated and phase shifted an amount depending upon the distance between its respective point on the object and an imaginary hologram plane spaced from the object. The object signals are vectorially added to each other and to a reference signal, which will be discussed in more detail below, to produce a signal whose magnitude represents the intensity of one "point" on the imaginary hologram plane. A separate vectorial addition is performed to produce individual signals whose magnitude represents the intensity of each "point" on the imaginary hologram plane, until a sufficient number of "points" have been determined to produce a complete hologram. The "point" signals are then recorded on a medium which can modulate visible light, as for example, a photographic transparency, the transparency being a hologram of the object.

The object signals may be electrical signals, the initial amplitude and phase of which are set to correspond to the amplitude and phase of their respective points on the object. To produce a "point" signal whose magnitude corresponds to the intensity of a "point" on the imaginary hologram plane, each object signal is attenuated an amount proportional to the distance between its respective point on the object and the "point" on the imaginary hologram plane being determined, and each object signal is phase shifted an amount proportional to this distance. A phase shift is also introduced into the reference signal depending upon the position of the "point" being determined. The object and reference signals are then vectorially summed to produce the "point" signal. When the next "point" signal is to be produced, the amount of attenuation and phase shift of the object signals must be varied, since the distance between the points on the object and the next "point" on the imaginary hologram plane changes.

In the alternative, the object signals may be signals which can be supported in a medium other than an electrical conductor, e.g., microwave signals. According to one embodiment of this invention, an array of signal propagators is provided, the individual propagators being in a spatial relationship corresponding to the spatial relationship of the points on the object. The array of signal propagators may be a three-dimensional array corresponding to the three-dimensional array of points on the object, or it may be a two-dimensional, or plane array corresponding to the array of points in a single plane of the object. The signal emanating from each propagator is modulated so that its magnitude and phase corresponds to the amplitude and phase of its respective point on the object. The propagator may be active sources such as microwave transmitters, or they may be passive reflectors such as microwave reflector antennas. In the latter case, all the reflectors are illuminated by a single source, and their reflectivity is varied depending on the data available about the object. A receiving means is provided adapted to scan across a plane spaced from the array of propagators, the scanning plane representing the imaginary hologram plane. In this arrangement, no additional attenuation or phase shifting means are required, since the object signals are necessarily attenuated and their phase varies as they travel from the propagators to the sensing plane. If a three-dimensional array is being employed, the "point" signal picked up by the receiver as it scans through each "point" in the sensing plane is the vectorial sum of all the object signals and a reference signal emanating from a reference signal source located outside the array of propagators. However, the two-dimensional array will occupy a different and corresponding position for each plane through the object which is to be reproduced and thus the array will develop a different "point" signal for each plane position. For each array position the "point" signal picked up by the receiver, as it makes a single scan through that point in the sensing plane, must be stored as a vector quantity and then vectorially added to the "point" signals developed for each of the other array positions and to a reference signal to develop the total "point" signal. The storage could be carried out, for example, on magnetic tape and the vectorial summation carried out electrically.

The "point" signals may be converted to visual form are recorded in the manner described in copending application Ser. No. 533,522, filed Mar. 10, 1966, now abandoned. In general, this is accomplished by applying the "point" signals to an oscilloscope, and then photographing the oscilloscope screen to produce a hologram transparency.

It should be mentioned that the method of this invention can be carried out without the use of sensible object signals. Once amplitude and relative position data are known about points on an object, a distance between the object and an imaginary hologram plane can be assumed, and the position of a reference signal source can be assumed. The intensity of each "point" on the imaginary hologram plane can then be calculated, such as by a computer. This calculation involves "attenuating" the amplitude of each object point by dividing it by the distance between the object point and the "point" on the imaginary hologram being determined, and "phase shifting" the amplitude of each object point by assuming a signal of some arbitrary wave length emanating from each object point and calculating the number of full and fractional cycles which would occur between the object point and the "point" on the imaginary hologram in order to determine the phase of the assumed signal when it reaches the imaginary hologram plane. A reference signal is also assumed and vectorially added to the assumed object signal during these calculations. Once the value of the "points" on the imaginary hologram plane is calculated, an oscilloscope can be adjusted to display points of corresponding intensity, and the oscilloscope screen photographed to produce a hologram of the object.

The invention will now be more fully described with reference to the accompanying drawings.

In the present specification and the claims which follow, the points on the object being recorded are described as having an "amplitude." This term is intended to refer to a vector quantity present at each object point which can be vectorially added to the amplitudes from the other object points to produce a resultant vector, or which can be represented by a vector signal. The term "intensity" is used to refer to the brightness or transmissivity of the "points" on the imaginary hologram plane and on the actual hologram produced by means of this invention.

Figure 1:
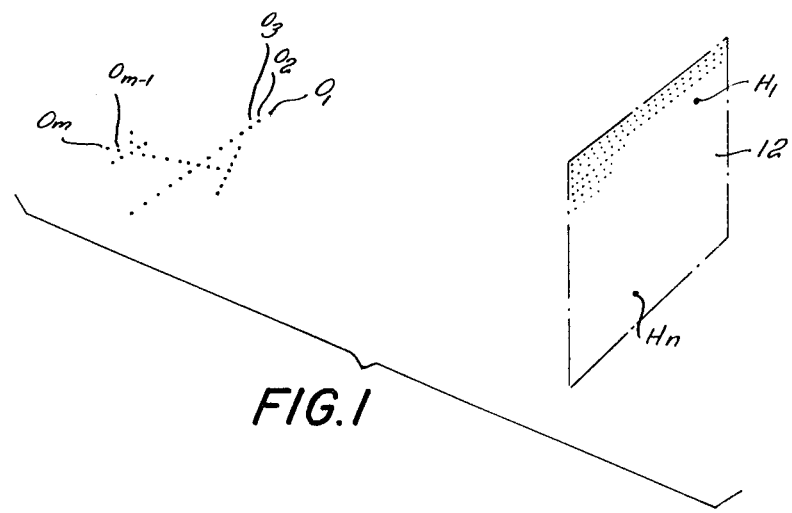
FIG. 1 is a diagram of points on an object to be recorded, and an imaginary hologram plane.

A typical situation with which the present invention is concerned is illustrated in FIG. 1 in which a three-dimensional object is represented, as shown at 10, by a plurality ($m$) of points on the object referred to by letters $O_1, O_2 \ldots O_m$. In the figure, the object points define the outline of an airplane. If the object is illuminated by energy of any type, the object points may be thought of as being point sources of energy. Therefore, each object point $O_1$–$O_m$ can be regarded as having a certain amplitude. A sufficient number of object points $O_1$–$O_m$ are employed to yield a suitable representation of the three-dimensional object 10.

The object point sources may represent the position and amplitude of points on an actual object, or they may represent assumed position and amplitude information of points on an imaginary object. It is to be understood that in either event, the object point sources contain position and amplitude information so that these point sources may readily be represented by an analogue signal or by a numerical or digital signal.

The type of energy used to illuminate the object in order to obtain amplitude and position data about the object points $O_1-O_m$ may be radar, sonar, X-rays, or any other type of energy capable of yielding the data required. For example, the required data may be obtained from laser or light echo signals, artificial geophysical echos or seismic wave data. Furthermore, the object need not necessarily be illuminated, since a self contained source of energy, such as a radioactive tracer, may be employed to render information about points on the object being traced. Also, the required data about an object may be assumed.

From the amplitude and position data about the object points $O_1-O_m$, the intensity of each of a plurality ($n$) of "points" on an imaginary hologram plane 12 is determined. The "points" on the imaginary hologram plane are referred to by the letters $H_1$ through $H_n$. Determination of the intensity of the "points" $H_1-H_n$ may be accomplished in a number of ways, as will be pointed out below. However, in general, the intensity of each "point" say "point" $H_1$, will be the resultant of the vectorial summation of the signals from all the points $O_1-O_m$ on the object reaching the "point" $H_1$. A reference signal must also be vectorially summed with the signals from the object points. Addition of the reference signal to the signals from the object points causes the resultant signal which defines the intensity of "point" $H_1$ to be an interference signal which represents not only amplitude information about the object points but phase information as well.

Figure 2:
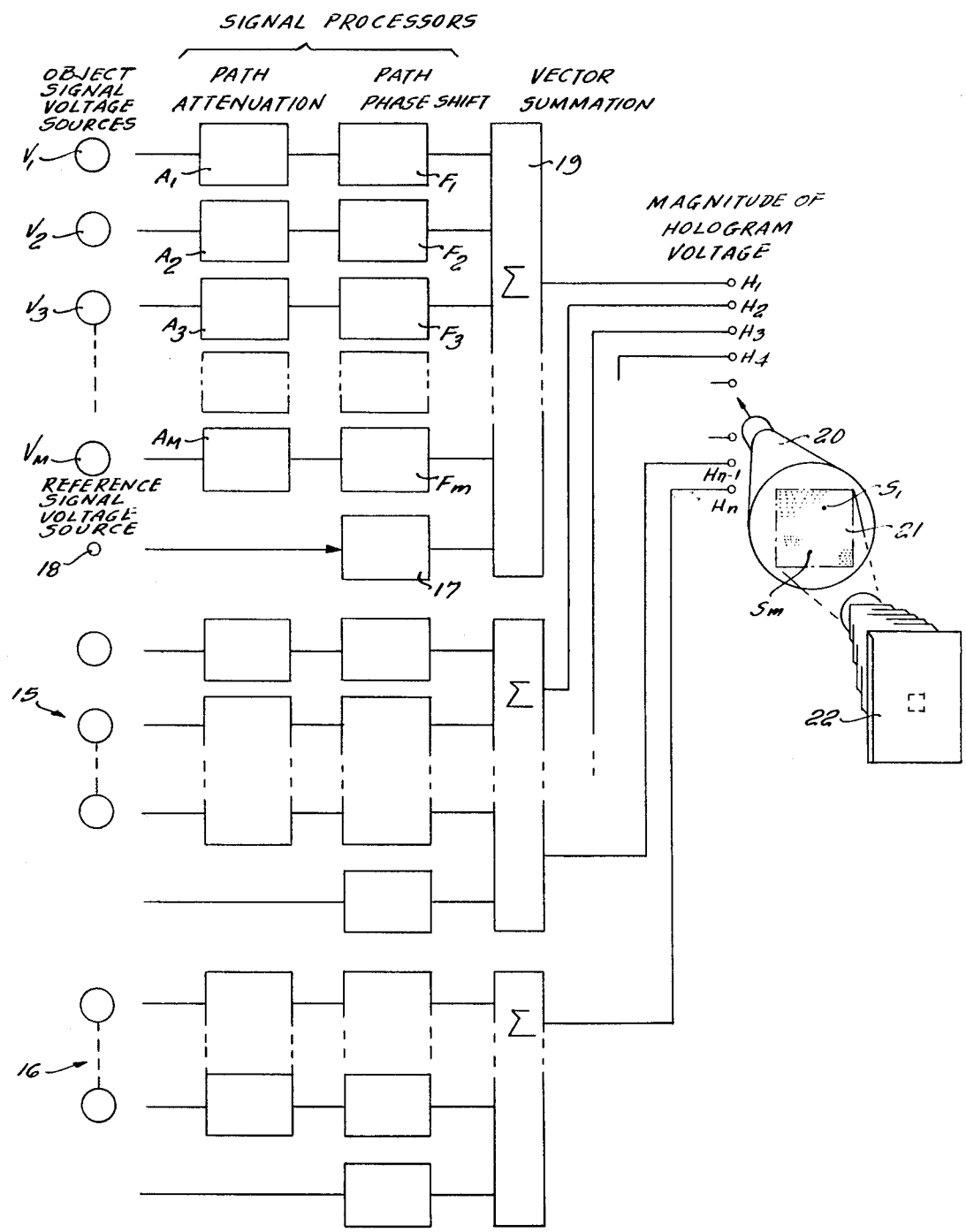
FIG. 2 is a schematic block diagram of one embodiment of an arrangement according to this invention for producing an artificial hologram.

FIG. 2 illustrates one way of vectorially adding the signals from the object points with a reference signal to determine the intensity of the "points" $H_1-H_n$, and then converting the resultant intensity information about the "points" $H_1-H_n$ into an optical hologram.

A plurality ($m$) of object signal voltage sources $V_1$, $V_2 \ldots V_m$ are provided, one voltage source being allocated to each of the points $O_1-O_m$ on the object. Preferably, the signals produced by the voltage sources are sine waves. By some means, not shown, the initial amplitude and phase of the voltage emanating from each source is adjusted to correspond to the amplitude and phase of its respective object point. Thus, the amplitude and phase of the voltage from source $V_1$ corresponds to the amplitude and phase of object point $O_1$. The output signal from each source $V_1-V_m$ is applied to a signal processor comprising an attenuator and a phase shifter. Thus, for example, the output signal from source $V_2$ is applied to an attenuator $A_2$ and a phase shifter $F_2$.

The adjustment of the attenuators $A_1-A_m$ and phase shifters $F_1-F_m$ is dependent upon the assumed spacing between the object 10 and the imaginary hologram plane 12. This spacing may be of an arbitrary value, but once selected must remain the same for all calculations leading to the determination of the intensity of the "points" $H_1-H_n$. Once the distance between the object point $O_1$ and the hologram "point" $H_1$ is fixed, by assumption, as just mentioned, the attenuator $A_1$ will be set to attenuate the signal from source $V_1$ an amount equivalent to the actual attenuation which a signal would experience if it traveled the assumed distance between the point $O_1$ and "point" $H_1$. As is well known, the amplitude of any signal is attenuated by $1/d$, where $d$ is the distance between the source of the signal and the point of reception of the signal. Each of the other attenuators $A_2-A_m$ is also adjusted depending upon the distance between their respective object points $O_2-O_m$ and the "point" $H_1$, on the imaginary hologram plane 12, whose intensity is being determined.

The amount of phase shift introduced into each signal from the sources $V_1-V_m$ by phase shifters $F_1-F_m$ depends not only upon the assumed distance between the object 10 and hologram plane 12, but also upon an assumed wave length of the signals from the object points $O_1-O_m$. Any arbitrary wavelength may be selected, as long as the wavelength is smaller than the distance between the adjacent object points $O_1-O_m$, in order to insure good definition in the final optical hologram. Furthermore, the signal wavelength selected must be used in making all the calculations leading to the determination of the intensity of "points" $H_1-H_n$. Once the distance between the object point $O_1$ and the hologram "point" $H_1$ is fixed, and the wavelength assumed to be emanating from the object point $O_1$ is fixed, the phase shifter F will be set to cause the phase of the signal from source $V_1$ to be equivalent to the phase of an actual signal, of the selected wavelength, at the time it would strike the imaginary hologram plane at "point" $H_1$. The phase of such an actual electromagnetic signal can, of course, be determined by dividing the distance between the point $O_1$ and "point" $H_1$ by the wavelength, the fractional amount of the quotient indicating the point in the cycle of the signal when it strikes point $H_1$, thus indicating the phase of the signal at the time of impingement. Each of the other phase shifters $F_2-F_m$ is also adjusted depending upon the distance between their respective object points $O_2-O_m$ and the "point" $H_1$.

The adjustments of the attenuators and phase shifters may be effected manually, after appropriate calculations are made. In the alternative, a computer can be adapted to make the required calculations and adjust the attenuators and phase shifters accordingly.

The outputs of all the phase shifters $F_1-F_m$ are applied to a device 19 which vectorially sums them. Also applied to the summing device 19 is a reference signal from a source 18, the reference signal being transmitted to the summing device via a phase shifter 17. In order to simulate an interference pattern analogous to the pattern produced by directing the reference beam of an optical hologram system at an angle to the light waves reflected from the subject, a phase shift is introduced into the reference signal by the phase shifter 17. It will be appreciated that if a reference beam having a sinusoidal wave form were actually directed at the imaginary hologram plane 12, at an angle to the plane, the phase of the reference beam as it strikes different levels of the imaginary hologram plane would vary. For example, if a positive peak of the reference wave form strikes the top of the imaginary hologram plane, obviously a negative peak of the wave will strike some point below the top. Thus, the phase shifter 17 is given some arbitrary setting when the "points" $H_1$, etc. disposed along the uppermost horizontal line of "points" in the plane 12 are being determined. When the "points" located in the next horizontal line in the plane 12 are being determined, the phase shifter 17 is adjusted to shift the reference signal from source 18 an amount corresponding to the phase shift in a reference beam which would appear to a viewer moving down the sensing plane.

The manner in which the intensity of "point" $H_1$ is determined has been described above. After "point" $H_1$ has been determined, the same apparatus described can be used to determine the intensity of "point" $H_2$, simply by readjusting the phase shifters $F_1-F_m$ and attenuators $A_1-A_m$. In this way, all the points $H_1-H_n$ can be successively determined by one set of voltage sources $V_1-V_m$, signal processors, summer, and reference source. In the alternative, a plurality of ($n$) of such sets can be provided, one set being used to determine the intensity of each "point" on the imaginary hologram plane. With such an arrangement, all the "points" would be determined simultaneously. In FIG. 2, a second set is indicated by the reference numeral 15, and an $n$th set is indicated by the reference numeral 16.

To convert the output signal of the summing device 19, the magnitude of which represents the intensity of the "point" on the imaginary hologram plane being determined, to visible form, the signal is applied as Z-axis modulation to an oscilloscope 20. The oscilloscope is scanned in such a way that the visible signal will appear on the oscilloscope screen 21 in a location corresponding to the location of the "point" on the imaginary hologram plane which it represents. Thus, visible point $S_1$ corresponds to "point" $H_1$, and point $S_n$ corresponds to "point" $H_n$. The oscilloscope screen can be photographed by a camera 22 to produce a hologram transparency. The hologram will be a record of the actual or non-existent object 10 which was represented by the plurality of object points $O_1$–$O_m$. The manner in which the transparency is viewed may be the same as that described in copending application Ser. No. 533,522, filed Mar. 10, 1966, now abandoned.

In the above example, electrical signals transmitted by electrical conductors are employed. However, if desired, a similar arrangement can be employed using electromagnetic waves in place of electrical signals, and wave guides instead of electrical conductors. Another alternative is the use of light waves transmitted by fiber optic strands, and still another is the use of acoustic waves in liquid or gas-filled tubes or in solid conductors. In each case, suitable attenuators and phase shifters are employed corresponding to those described above.

Figure 3:
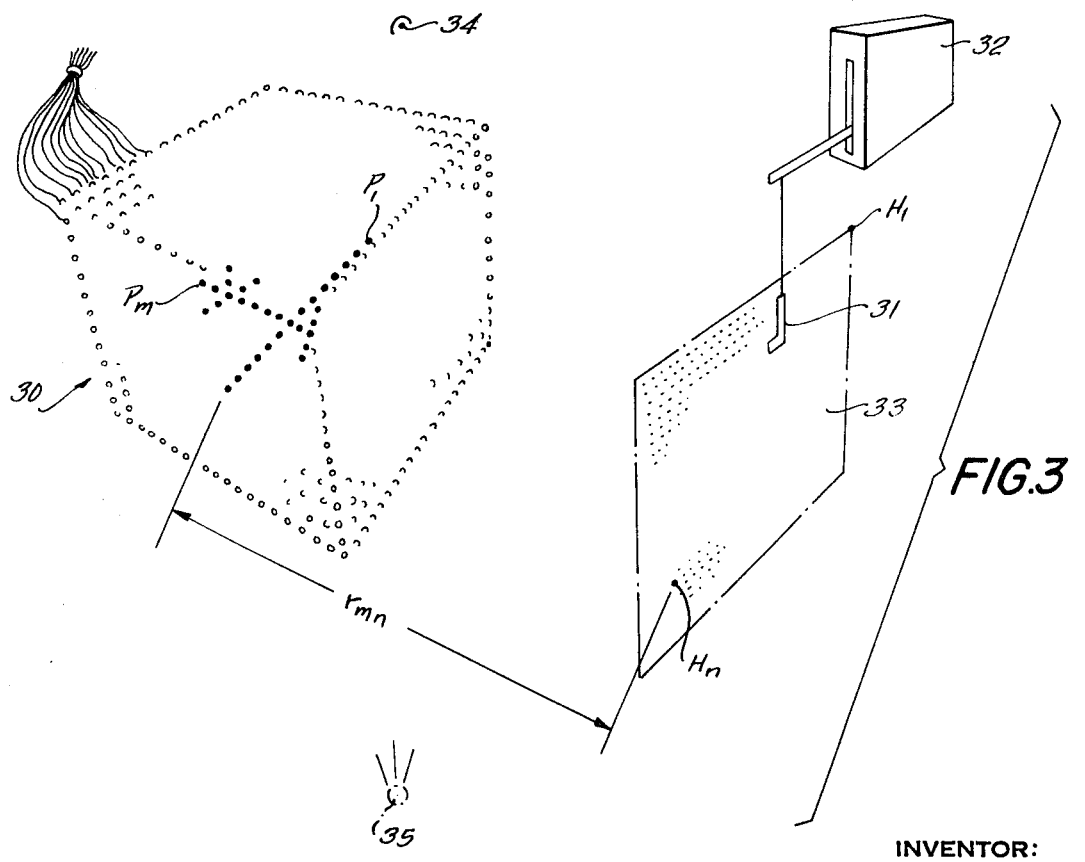
FIG. 3 is a diagram of a second embodiment of this invention utilizing a plurality of signal propagators to produce object signals which are vectorially summed.

FIG. 3 illustrates an alternative arrangement for vectorially summing the signals from object points $O_1$–$O_m$ with a reference signal. In this arrangement, a cubical array 30 of signal propagators is provided. These propagators may be active signal sources, such as audio oscillators or microwave transmitters, or they may be passive reflector sources, such as dipole microwave antennas. Assume, for the sake of description, that the signal propagators are microwave transmitters, each of which produces a signal having the same frequency as all the other transmitters and having phase coherency with the signals from the other transmitters.

Since the arrangement of transmitters is a three-dimensional array, it will be appreciated that a number ($m$) of transmitters can be selected which have the same relative positions as the points $O_1$–$O_m$ on the object. These selected transmitters $P_1$–$P_m$ are shown darkened in FIG. 3. Spaced from the array 30 is a sensing device, which may be a microwave receiver 31, mounted on a scanning device 32, the scanning device serving to scan the receiver 31 across a sensing plane 33 which represents the imaginary hologram plane 12. Located outside the array 30, at some arbitrary location, is another microwave transmitter 34 which produces a reference signal having the same frequency as the signal from the transmitters within the array and being phase coherent with the signals from those transmitters. The array 30, reference source 34, and receiver 31 are all placed in a medium capable of supporting the energy waves emanating from the transmitters. This medium may be air, or it could be water.

In use, the transmitters $P_1$–$P_m$ are activated, and by a means not shown the amplitude of the signal emanating from each transmitter is adjusted to correspond to the amplitude of the object point $O_1$–$O_m$ which it represents.

The receiver 31 is placed at a starting position, say the point $H_1$ in the sensing plane. The signal received by the receiver 31 will obviously be the vectorial sum of all the signals emanating from the transmitters $P_1$–$P_m$ and the reference signal from source 34. Furthermore, the signals from the transmitters $P_1$–$P_m$ will necessarily be attenuated as they travel to the sensing plane 33, and their phase will be varied as they travel, the amount of attenuation of the signals, and their phase when they reach the receiver 31 being dependent upon the distance between each transmitter and the point $H_1$ occupied by the receiver. The signal received by the receiver 31 may be mathematically expressed in the following manner: Assuming that $P_m$ is any individual source; $H_n$ is any individual point in the sensing plane; $R_n$ is the reference signal impinging at point $H_n$; and $r_{mn}$ is the distance between $P_m$ and $H_n$; then the intensity of point $H_n$ is expressed in the vector summation: Intensity of $$H_n = \sum_{m=1}^{m} \overline{P}_m(r_{mn}) + \overline{R}_n$$

Thus, it will be seen that the arrangement of FIG. 3 automatically performs the function of the attenuators $A_1$–$A_m$ of FIG. 2, as well as the function of the phase shifters $F_1$–$F_m$ of FIG. 2. It will also be appreciated that no phase shifter, comparable to phase shifter 17 of FIG. 2, need be associated with the reference source 34.

The receiver 31 is scanned from point-to-point in the sensing plane until it has received a signal at each of the points $H_1$–$H_n$. The manner in which the signals received by the receiver 31 are converted to visible form and then recorded to produce a hologram may be the same as described above with reference to FIG. 2 or as described in the above-mentioned copending application.

In the above-described embodiment of FIG. 3, the signal propagators $P_1$–$P_m$ were considered to be active sources. However, if preferred, passive reflectors such as dipole antennas may be used as the signal propagators. In such a case, a source of coherent energy, such as a microwave transmitter 35, will be used to illuminate the array 30. As mentioned above, certain of the propagators in the array 30 will correspond to points on the object $O_1$–$O_m$, and each of these antennas has its reflectivity adjusted so that the magnitude and phase of the signal reflected from it will correspond to the object point which it represents. For example, the reflectivity of a dipole antenna can be adjusted by varying the impedance at the center of the dipole. Those antennas in the array which do not correspond to any point on the object will be caused to reflect no energy. The reference source 34 may be replaced by a reflector, or an active reference source may be employed, as long as its frequency is the same as that of the illuminating source 35, and it has phase coherence with the illuminating source.

Figure 4:
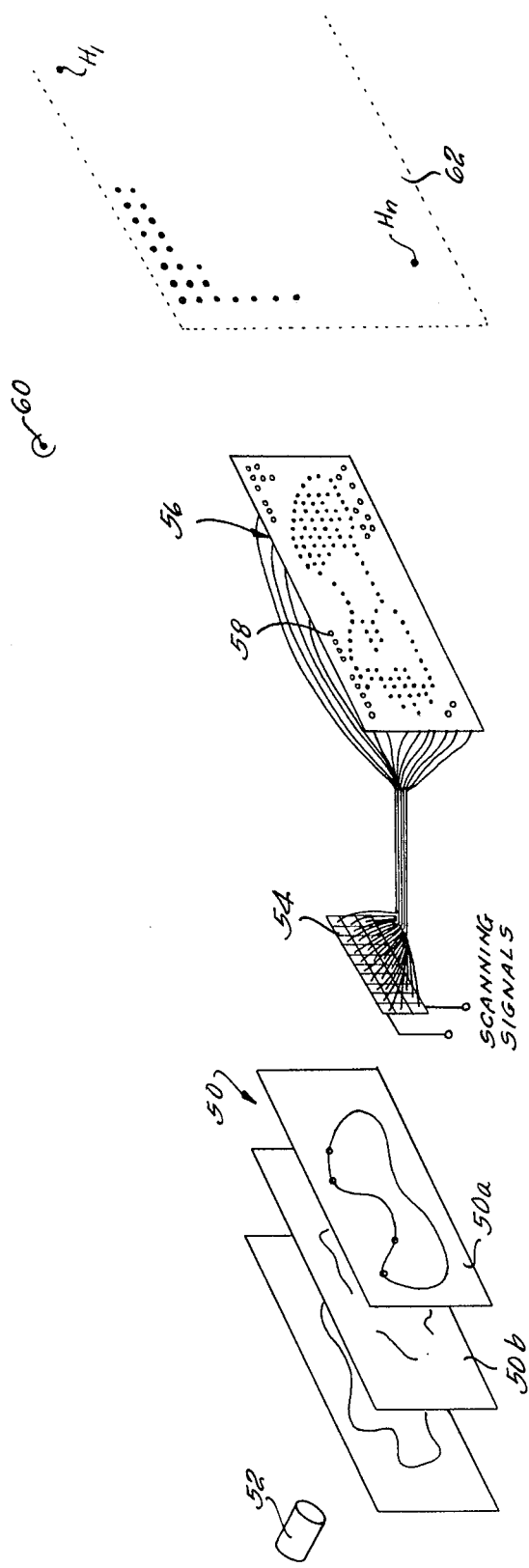
FIG. 4 is a schematic diagram of a further embodiment of this invention in which a plane array of signal propagators is employed.

The array of signal propagators need not necessarily be a three-dimensional one, as shown in FIG. 3. In the alternative, a two-dimensional array of propagators can be used. Such an arrangement is illustrated in FIG. 4. In the figure, a series of tomograms 50 is shown. Of course, plane data derived from three-dimensional data about the object can also be employed. As is known, tomograms are X-ray photographs taken through different planes of an object, which may be an organ of the human body. Thus, each of the tomograms 50a, 50b, etc. contains information concerning points on the object contained in one plane. If each tomogram is illuminated individually from behind, as by a source of light 52, amplitude information will be available about any desired number of object points in the plane corresponding to the ttomogram being illuminated.

Assume that the tomogram 50a is first illuminated by the light source 52. Any suitable device, such as a bank of photocells 54, may be used to determine the brightness at a discrete number of points on the tomogram. This brightness information is used to adjust the signal propagators 58 in the plane array 56 so that each propagator which corresponds in position to one of the points on the tomogram produces a signal having a magnitude corresponding to the brightness of the point on the tomogram which it represents. The coherent signals from the propagators 58, together with a coherent reference signal from source 60, are directed at a receiver (not shown) which scans through a sensing plane 62, as described above with reference to receiver 31. All the signals picked up by the receiver as its scans through points $H_1$–$H_n$ in the sensing plane are recorded in a manner which preserves phase and amplitude information, such as on magnetic tape.

The next tomogram 50b is then illuminated and monitored by the photocell bank 54. Prior to this, however, the array 56 is moved with respect to the scanning plane 62 a distance corresponding to the spacing between the tomograms 50a and 50b. Once again the propagators 58 are adjusted so that the amplitude of the signal from each corresponds to the brightness of the point on the tomogram which it represents. The signals picked up by the receiver in the sensing plane 62 are recorded. When all the tomograms have been illuminated, and signals derived from them at the sensing plane are recorded, the recordings corresponding to each point on the sensing plane must be vectorially summed, which summation may be accomplished electrically, to form a composite signal for each point. From these composite signals a photographic transparency will be made which will be a hologram of the object represented by the tomograms 50.

It should be mentioned that in the embodiments of FIGS. 3 and 4, the reference signal need not necessarily be provided by a source, such as source 34 or 60, which directs the reference signal toward the sensing plane. Instead, the reference signal can be an electrical signal added at a point between receiver 31 and the oscilloscope. In such a case, a phase shifter is provided to adjust the phase of the reference signal in order to simulate an interference pattern as described above with reference to the phase shifter 17 of FIG. 2. The arrangement can be similar to the electrical reference signal employed in the above-mentioned copending application.

It will be appreciated that the present invention has provided a method and an apparatus, by means of which an artificial optical hologram can be produced from data other than direct energy reflections from the object to be recorded. In fact, by means of the present invention, there need be no object at all as any object may be postulated by a series of assumed or computed signals which represent the object. All that need be available for the formation of an artificial hologram is data concerning the intensity and relative position of a sufficient number of points on the object.

It should be clear that modification of certain details of this disclosure may be made without departing from the spirit and scope of this invention as defined in the appended claims.

What is claimed is:

1. A method for producing an artificial hologram of an object from a plurality of "points" on an imaginary hologram plane, said method comprising the steps of determining the intensity of each "point" on the hologram plane by:
   (a) producing a plurality of phase coherent object signals, each of said object signals representing the position, amplitude, and phase of a point on the object, but said object signals emanating from a source other than the object itself,
   (b) providing a reference signal representing a signal source disposed at an arbitrary location with respect to the object, said reference signal having phase coherency with said object signals and being at the same frequency as said object signals,
   (c) vectorially summing said object signals with said reference signal, a separate summation being carried out for each point on the hologram plane, and
   (d) recording the magnitude of each resultant signal (produced by step (c)) on a medium capable of modulating visible light to produce points on said medium each corresponding to the "point" on said imaginary hologram plane.

2. A method as defined in claim 1 wherein step (a) comprises:
   providing an array of signal propagators arranged in a spatial relationship corresponding to the spatial relationship of the points on the object, and
   modulating the signal from each propagator to correspond to the amplitude of its respective point on the object.

3. A method as defined in claim 2 wherein said signal propagators are active signal sources.

4. A method as defined in claim 2 wherein said signal propagators are passive reflectors, said reflectors being illuminated by a coherent energy source and the reflectivity of the reflectors being adjustable.

5. A method as defined in claim 2 wherein the summing step (c) is accomplished by sensing the amplitude and phase of the resultant signal at each "point" in a sensing plane spaced from said array.

6. A method as defined in claim 5 wherein the reference signal of step (b) is directed toward said sensing plane along with the signals from said array of propagators.

7. A method as defined in claim 5 wherein the reference signal of step (b) is added to the vectorially summed signals after they leave the sensing plane.

8. A method as defined in claim 1 including the steps of illuminating the object and scanning the illuminated object to determine the amplitude of said points on the object.

9. A method as defined in claim 1 wherein the summing step (c) comprises attenuating each of said object signals an amount proportional to the distance between its respective point on the object and said "point" on said imaginary hologram plane, and introducing a phase shift into each of said object signals proportional to the distance between its respective point on the object and said "point" on said imaginary hologram plane.

10. A method as defined in claim 9 including the step of introducing a phase shift into the reference signal of step (b), the amount of said phase shift depending upon the position of the "point" on the imaginary hologram plane being determined.

11. A method as defined in claim 10 wherein said object signals and reference signal are electrical signals.

12. A method for producing an artificial hologram from data representing the amplitude and relative position of a number of points on the object to be recorded, comprising:
   (a) arbitrarily selecting a distance between the object and an imaginary hologram plane said selection having no reference to the location of an actual object,
   (b) selecting a reference signal source disposed at an arbitrary location with respect to the object,
   (c) determining the intensity at a plurality of "points" on the imaginary hologram plane by vectorially summing the amplitudes of all said object points and said reference signal,
   (d) converting the determinations of step (c) to visual points, and
   (e) recording the visual points on an optical recording medium.

13. Apparatus for producing an artificial hologram of an object, said hologram being derived from a plurality (n) of "points" in an imaginary hologram plane, comprising:
   (a) a plurality (m) of signal sources, each source being allocated to one discrete point on the object, but each source being apart from the object itself,
   (b) means for adjusting the magnitude and phase of the signal emanating from each of said sources (a) so that the magnitudes and phases of said signals correspond to the amplitudes and phases of their respective object points,
   (c) means for altering said signals after they leave said sources, said alteration representing the alterations which would occur to actual signals traveling from said object to the "point" on the imaginary hologram plane whose intensity is being determined,
   (d) means for providing a reference signal,
   (e) means for vectorially summing the signals from said sources (a) and said reference signal to determine the intensity at each "point" in the imaginary hologram plane, and (f) means for recording the resultant intensities at all of said "points."

14. Apparatus as defined in claim 13 wherein said signal-adjusting means (b) includes means for illuminating the object, and means responsive to the illuminating energy leaving the discrete object points ($m$) for adjusting said signal sources (a).

15. Apparatus as defined in claim 13 wherein said signals (a) are electrical signals, and said altering means (c) includes a signal processor connected between each source (a) and said summing means (e), said processor comprising an attenuator and a phase shifter, each of said processors serving to attenuate and phase shift its respective signal (a) an amount proportional to the distance between its respective object point and the "point" on the imaginary hologram plane being determined.

16. Apparatus as defined in claim 15 wherein said reference signal (d) is an electrical signal, and including a phase shifter connected between said reference signal source (d) and said summing means (e), said phase shifter serving to shift the phase of said reference signal an amount dependent upon the "point" in the imaginary hologram plane being determined.

17. Apparatus as defined in claim 13 wherein said signals (a) are electromagnetic waves, and said altering means (c) and summing means (e) include a receiver spaced from said sources (a) and adapted to receive electromagnetic waves from the latter.

18. Apparatus as defined in claim 17 including means for scanning said receiver across a sensing plane representing said imaginary hologram plane.

19. Apparatus as defined in claim 13 wherein said signals (a) are sonic waves, and said altering means (c) and summing means (e) include a microphone spaced from said sources (a) and adapted to receive sonic waves from the latter.

20. Apparatus as defined in claim 13 wherein said signal sources (a) are arranged in a three-dimensional array.

21. Apparatus as defined in claim 13 wherein said signal sources (a) are arranged in a two-dimensional array.

References Cited

UNITED STATES PATENTS

| | | | |
|---|---|---|---|
| 3,284,799 | 11/1966 | Ross | 343—6 |
| 3,400,363 | 9/1968 | Silverman | 343—6 |

ROBERT L. GRIFFIN, Primary Examiner

D. E. STOUT, Assistant Examiner

U.S. Cl. X.R.

350—3.5; 340—15.5